Feb. 9, 1926.

J. G. BALSILLIE 1,572,853

LIGHT PROJECTOR

Filed Sept. 19, 1922     5 Sheets-Sheet 1

Inventor.
John Graeme Balsillie.
By: Marks & Clerk
Attys.

Feb. 9, 1926. 1,572,853
J. G. BALSILLIE
LIGHT PROJECTOR
Filed Sept. 19, 1922   5 Sheets-Sheet 2

Inventor:
John Graeme Balsillie.
By: Marks & Clerk, Attys.

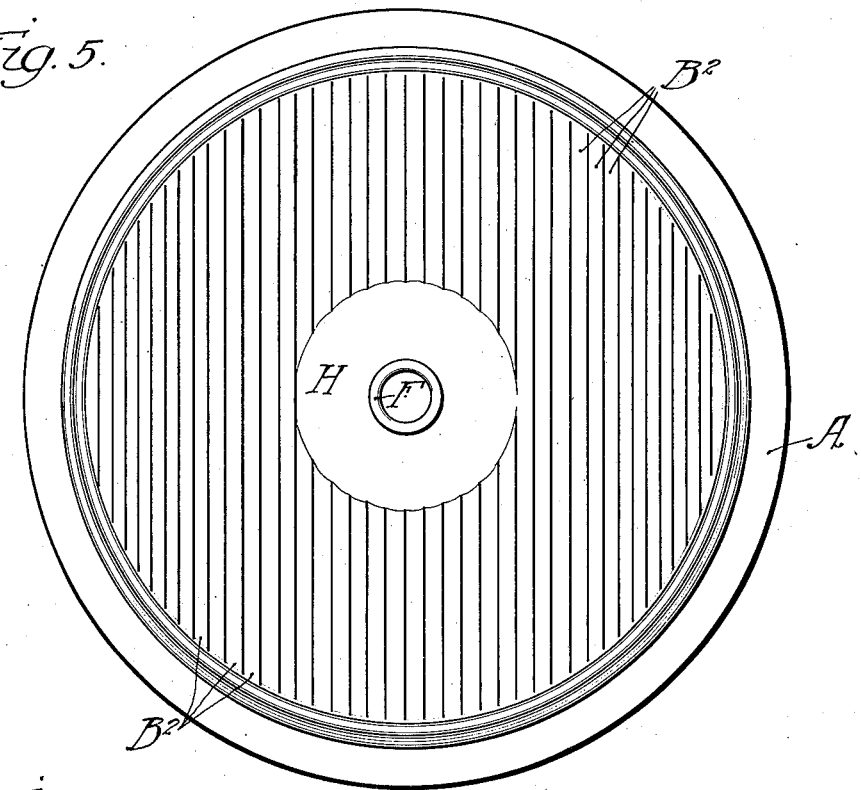
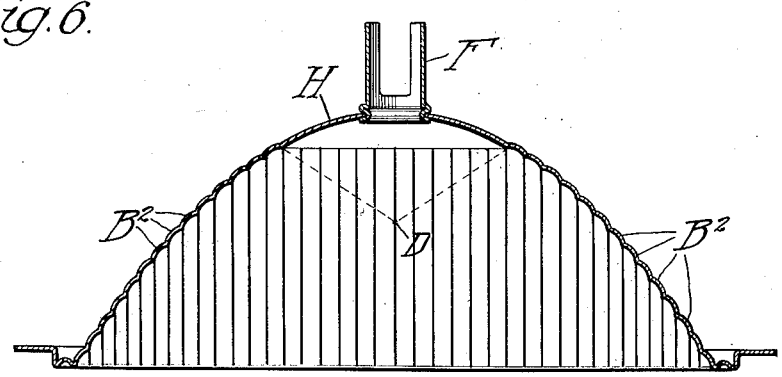
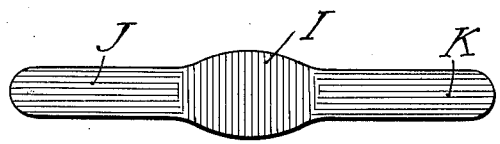

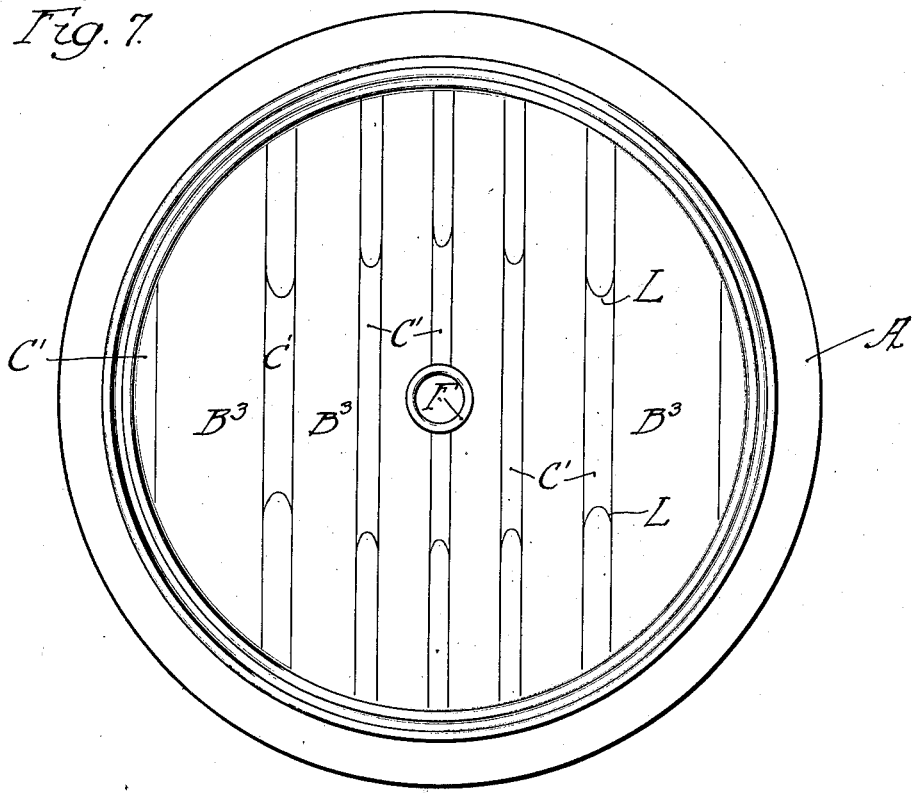
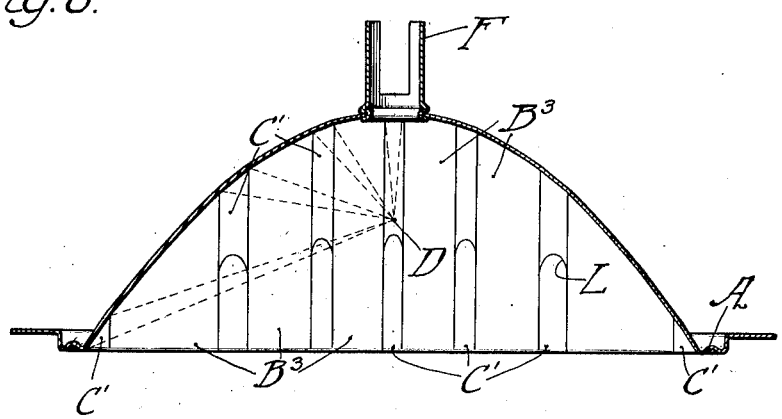

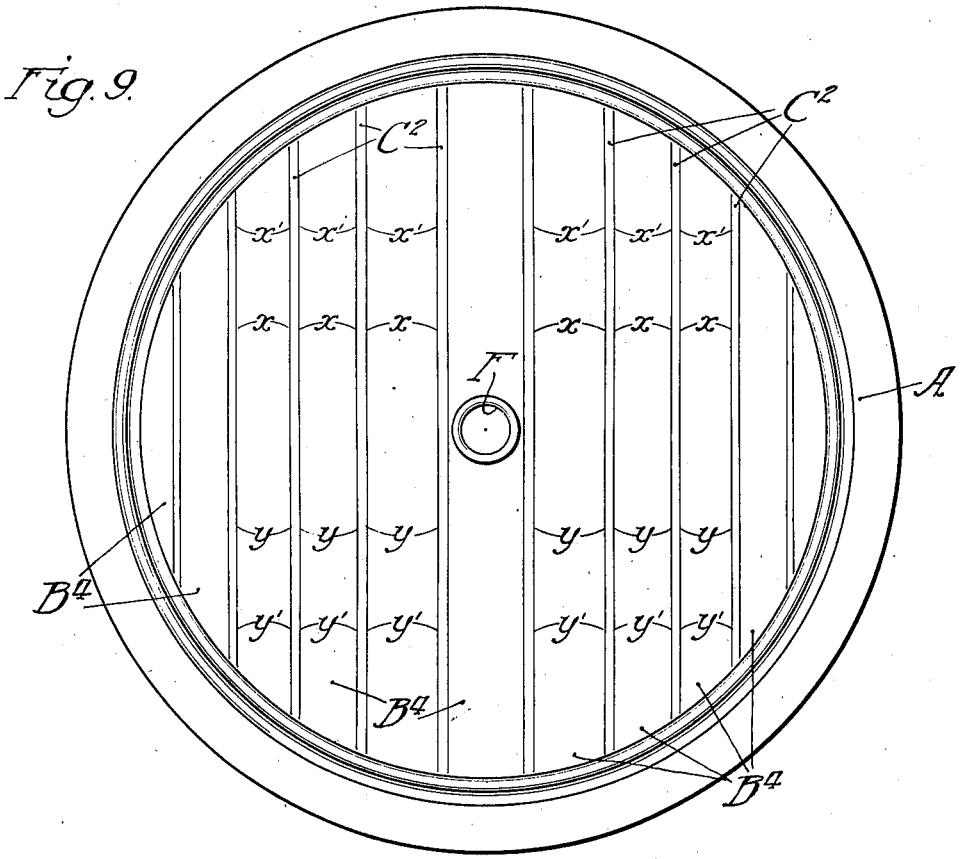
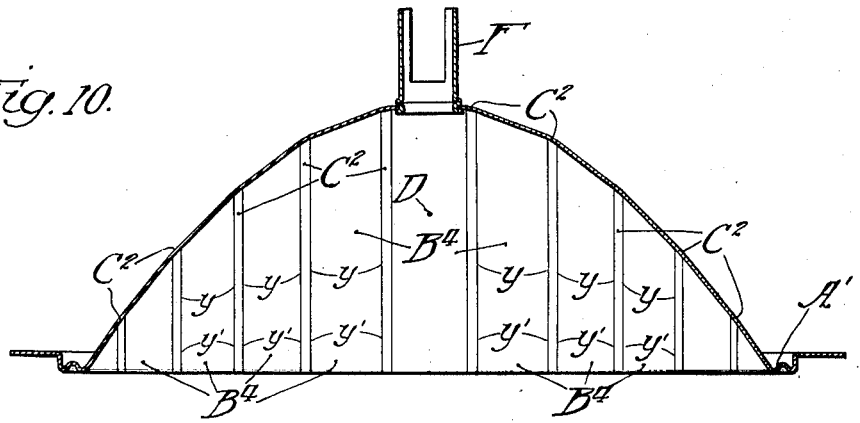

Patented Feb. 9, 1926.

1,572,853

UNITED STATES PATENT OFFICE.

JOHN GRAEME BALSILLIE, OF MELBOURNE, VICTORIA, AUSTRALIA, ASSIGNOR, BY MESNE ASSIGNMENTS, TO THE AMERICAN FLATLITE COMPANY, OF CINCINNATI, OHIO, A CORPORATION OF OHIO.

LIGHT PROJECTOR.

Application filed September 19, 1922. Serial No. 589,284.

*To all whom it may concern:*

Be it known that I, JOHN G. BALSILLIE, a subject of the King of England, and residing at Melbourne, Australia, have invented certain new and useful Improvements in Light Projectors, of which the following is a specification.

This invention relates to improvements in reflectors for use in light projectors and is more particularly adapted for the head lamps of vehicles such as motor cars, locomotives and the like.

When the roadway in front of a vehicle is brilliantly illuminated by non-diffused light, the driver or observer has difficulty in seeing objects beyond the area of illumination. The reason for this is that the light reflected back from the illuminated area decreases the resolving power of the eye, thereby reducing contrast which is essential to definition and vision. It has long been known that better visibility is obtained by diffused lighting.

In my Patent No. 1,390,747 I have described a construction of reflector adapted to project light diffused in an elliptical beam having a short vertical axis and an extended horizontal axis, the terms "vertical" and "horizontal" being here used in reference to the manner in which such a reflector is used in the head lamp of an automobile.

It is very desirable, however, in some instances as in automobile head lamps to obtain a beam of light which has a considerably greater height vertically over a comparatively narrow strip located centrally between the ends of the beam than it has at such ends. It is also desirable to obtain an increased light intensity in the vertical center of such central strip.

The object of the present invention is to provide a construction of reflector adapted to project a beam of light having the characteristics above noted. At the same time it is an object of the invention to provide a construction of reflector adapted for quantity production in cheap metal with a relatively high degree of accuracy.

I accomplish this object by providing a portion only of the reflecting surface of the reflector with parallel configurations, which function to reflect light diffusely in one plane and substantially regularly in the plane at right angles thereto. The non-configurated portion of the reflector reflects light regularly in accordance with its curvature. The ratio of configurated to non-configurated area will vary as the nature of the light distribution sought to be produced varies. For instance, a parabolic or hyperbolic reflector capable of projecting a beam of light having the characteristics before mentioned will be obtained by configuring from one-half to seven-eighths of the area of the reflecting surface of the reflector measured by the angle subtended at the focus of the reflector in a plane at right angles to the plane of configuration, the remaining one-half to one-eighth of the area of the reflecting surface being left as a regular section or sections of a parabola or hyperbola.

The parallel configurations operate to impart regular astigmatism to that area of the reflecting surface they subtend. The beam of light projected by the configurated area is therefore elliptical in cross section and the eccentricity of the foci of the ellipse varies with the amount of displacement from the mean curve of the reflector in which the configurations are formed. The non-configurated area of the reflecting surface projects light regularly with the result that a composite beam is projected.

Such parallel configurations may be formed in any suitable manner in the reflecting surface and may have varying values as to width and/or radius, provided always that the edges of these configurations conform to the original contour of such surface. For high grade reflectors I prefer that degree of diffusion which is attained by a radius of curvature of seven thirty seconds of one inch with a width of one thirty-fifth of an inch and for lower grade reflectors I prefer a radius of curvature of six and one-half inches with widths up to one and one-half inches, dependent upon the size of the reflector. The reason for this increased width and curvature, is the stretching of the surface of the metal in manufacture. The greater width means, of course, a smaller number of configurations in a given reflector and this permits of cheaper metal being used. As the number of configurations increases the metal used must be of a higher grade and more ductile.

This invention can be embodied in a reflector in a number of different ways. The configurated area may be kept to one portion of the reflector, say the center and the remainder left regular, or the reverse may be employed. From the viewpoint of appearance and simplicity of construction I prefer a design wherein the parallel configurations alternate with regular sections. This arrangement has considerable manufacturing advantages as no sharp corners occur and buffing troubles are largely reduced. The whole surface of the reflector is made highly reflecting.

The curvature of the reflector and the location of the source of light determines, within margins, the shape of the cross section of the projected beam as also the distribution of the light intensity in the illuminated area. The parallel configurations operate to diverge the light they project in a plane at right angles to the plane of configuration. The source of light should always be located at or about the focal point of that meridian of the reflector with which the configurations are parallel.

In order that this invention may be better understood I will now proceed to describe same by reference to the accompanying sheets of drawings, in which—

Figure 1 is an elevation; and

Figure 2 a cross section of a parabolic reflector which has been configurated in accordance with this invention.

Figures 3 to 8, are views, similar to Figures 1 and 2 respectively, of three other forms of reflectors in accordance with this invention.

Figures 9 and 10 are views in elevation and cross section respectively, of a hyperbolic reflector which has been configurated in accordance with this invention.

Figure 11 illustrates in a general manner the shape of the illuminated area produced by reflectors in accordance with this invention.

Figure 1:
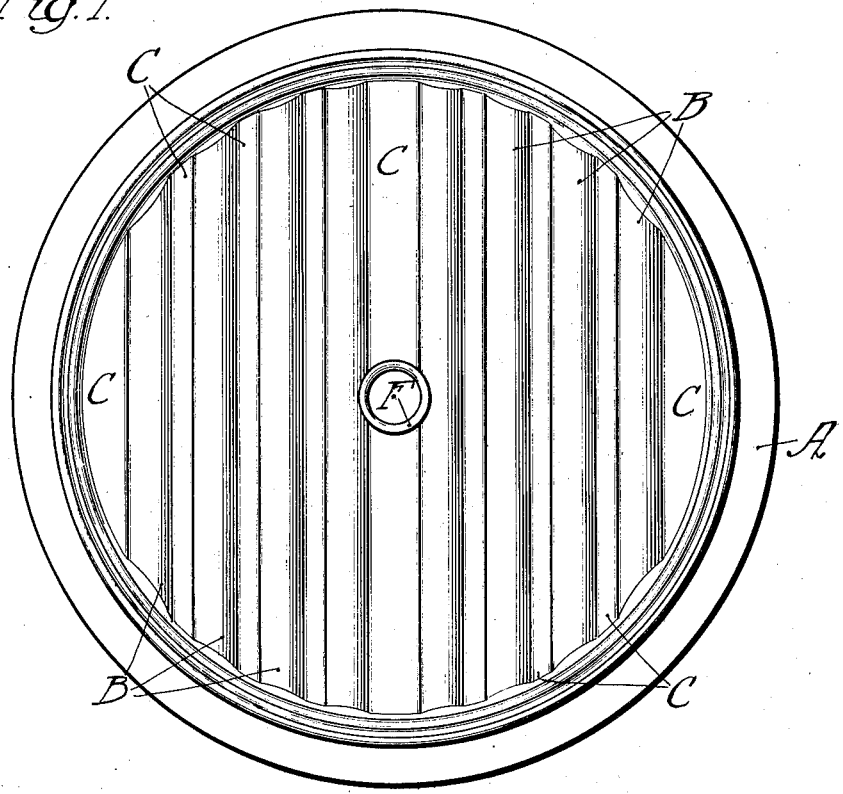
Figure 2:
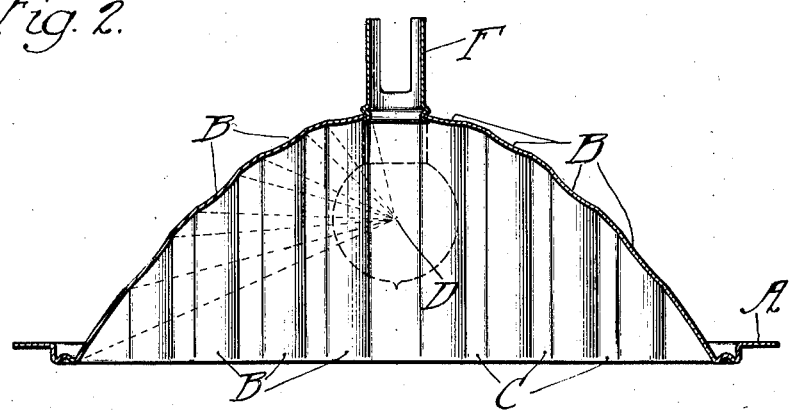

In carrying this invention into effect in the manner shown in Figures 1 and 2, it will be seen that the parabolic body A of the reflector is provided with a series of configurations B parallel to the vertical meridian of the reflector, these configurations being separated by strips C, having the curvature of the parabolic body itself. In this particular form of reflector a small number of configurations of considerable width are employed so that the reflector can be made in cheap metal as already remarked. The configurations are of varying width as measured on the surface of the reflector and subtend varying angles at the focus D of the reflector. The angle subtended at this focus D by the entire surface of the reflector is about 228° and the total of the angles subtended by the eight corrugations B shown in this figure is about 131°. It will thus be seen that the total area of the corrugations B subtends at the focus D an angle equal to approximately 7/12 of the angle subtended by the whole area of the reflector at the same point. The uncorrugated area of the reflector is therefore approximately 5/12 of the total area of the reflector. The corrugations B when projected, however, on to the plane containing the edge of the reflector are of equal width.

The source of light is indicated by the lamp E held within the socket F and the center of the filament of the lamp is presumed to approximate to the focus D of the reflector.

Figure 3:
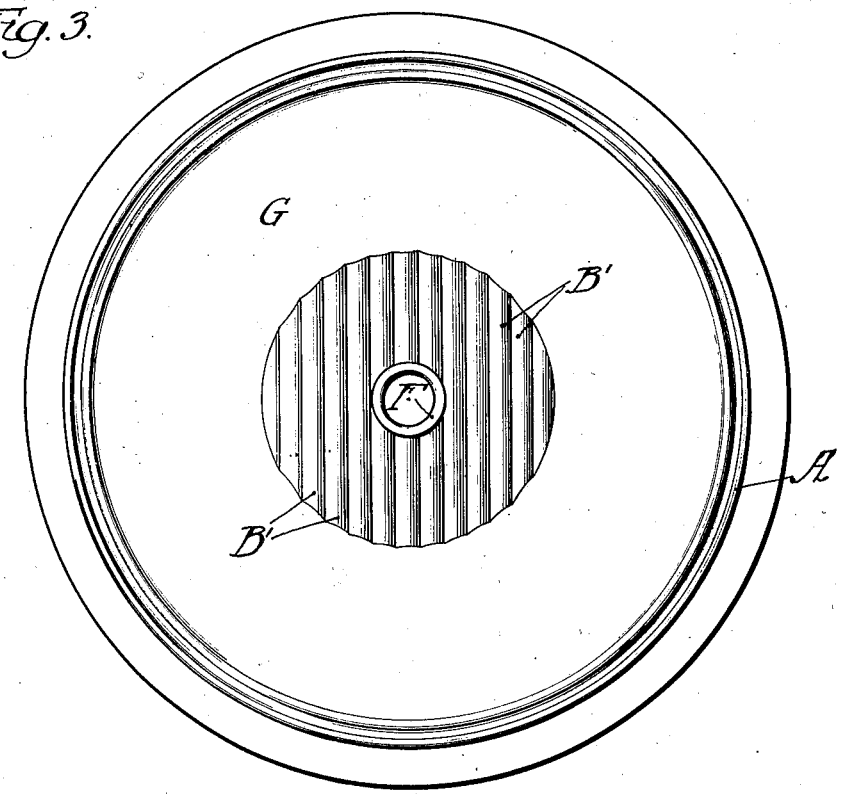
Figure 4:
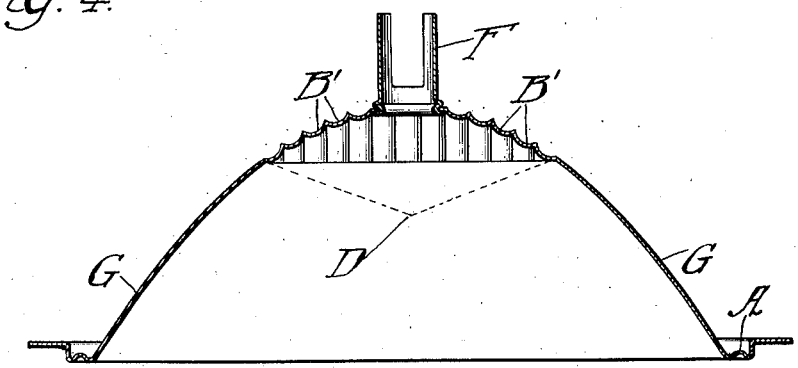

In the modifications shown in Figures 3 and 4 the outer part G of the reflector body A is left unmodified and only the central portion of the reflector body is provided with parallel configurations, the area of this portion being such as to subtend at the focus D of the reflector an angle equal to about 7/12 of the angle subtended at such point by the total area of the reflecting surface. As shown in this modification the configurations $B^1$ provided over this central area are convex to the reflecting surface and of smaller width than the configurations B shown in the reflector illustrated in Figures 1 and 2.

The modification shown in Figures 5 and 6 is the reverse of that shown in Figures 3 and 4 in that the central portion H of the reflector body has the original parabolic curvature, while the configurations are formed in the outer edge of the reflector. In this case, however, the area of the configurated portion is chosen so that the same subtends at the focus D of the reflector an angle equal to about one-half of the total angle subtended by the whole area of the reflecting surface. In this instance the configurations $B^2$ are shown as of narrow width and concave to the reflecting surface.

A reflector having a parabolic base which has been configurated in accordance with this invention is shown in Figures 7 and 8. The parabolic base is represented by the reference $C^1$, while the parallel configurations are represented by the reference $B^3$. These configurations $B^3$ are separated by strips $C^1$ having the curvature of the original parabolic base. The configurations $B^3$ may be of any desired curvature. These may also all be given a similar or dissimilar formation, both as to curvature and width as desired. The total angle subtended at the focus D of the reflector in a plane at right angles to the plane of the configurations by all of the configurations is equal to about seven-eighths of the angle subtended at the focus by the whole area of the reflector. The parabolic strips $C^1$ thus subtend one-eighth of this total angle. The strips $C^1$ are preferably, as shown, all of equal width as measured on the surface of the reflector.

Some or all of the configurations $B^3$ may be given a modified formation at different points in their length. As shown in Figures 7 and 8 the central configuration $B^3$ is of a given curvature throughout its full length; whereas the configuration to each side of this central configuration is modified at its end so as to have a curvature of lesser radius than the central portion of the configuration, the change from the one curvature to the other being effected gradually. Figures 9 and 10 illustrate a reflector having a hyperbolic base, the base being represented by the reference $C^2$ while the parallel configurations are represented by $B^4$. These configurations $B^4$ are separated by strips $C^2$ having the curvature of the original hyperbolic base. The configurations $B^4$ may be of any curvature desired. These configurations may also be given a similar or dissimilar formation both as to curvature and width. Some or all of the configurations $B^4$ may be given a modified formation at different points in their length. As shown in Figures 9 and 10 the central configuration $B^4$ is on a given curvature throughout its full length, whereas the configuration to each side of this central zone or configuration is modified at its ends so as to have a curvature of lesser radius than the central portion of the configuration. Thus these two configurations located on each side of the central configuration will, as shown in Figure 9 more particularly, have a given curvature over the central portion of its length indicated by the letters $x$, $y$. From the point $x$ to the point $x^1$, and also from the point $y$ to the point $y^1$, the curvature of the configuration is changed gradually until at the point $x^1$ and $y^1$ the curvature of the desired lesser radius is obtained, which curvature is then continued to the rim of the reflector.

The radius of curvature of the end portions of these configurations is preferably smallest in the configuration adjoining the central configuration and progressively increased in the configurations spaced further from the central configuration.

This form of reflector has the advantage that an accurate positioning of the source of light is not so essential as with the parabolic forms of reflector. In fact, the source of light can be shifted forwardly from the focus D resulting in an increased concentration of light towards the center of the projected beam, whereas by withdrawing the source of light inwardly of the point D the projected beam is increased in depth and larger portions of the reflected light are thrown towards the top and bottom of the beam producing a more uniformly illuminated pattern. Throughout this range of adjustment the general shape of the upper edge of the projected beam is not altered, nor are any undesirable stray rays produced. Thus within certain limits the distribution of light in the projected beams may be varied by a slight alteration of the focal adjustment in the source of light.

The particular shape of the illuminated area produced by reflectors in accordance with this invention is illustrated in Figure 11. It will be seen that the joint effect of the configurated and non-configurated areas of the reflector is to produce an elliptical beam J, K having an extended horizontal axis and a short vertical axis, the vertical height of the beam being however increased over a comparatively narrow strip I located centrally between the ends of the beam.

It is of course understood that the focus of every reflector is theoretically a point. The intention in practice is to place the source of light at this point. The endeavor of lamp manufacturers is to produce a source of light of small area. The filaments of the best lamps obtainable, however, have considerable relative dimension. The result is that when these lamps are placed in a reflector with the filament at or about the focal point only a certain portion of the filament is really at the focal point, the remainder being about this point. In the case of a parabolic reflector, the dispersion of the projected light from this out-of-focus section is considerable, amounting to 4° or 5°. Again the inherent dispersion from the central portion of a parabolic reflector is much greater than from those portions adjacent the rim because of the relative proximity of the source of light to such central portion as compared with such rim portions, that is to say, the amount of dispersion, decreases towards the rim of the reflector. This concentration which the rim portions give is bad, in that it gives a non-uniform light distribution and to overcome this, I introduce the slight flattening of these parabolic sections above described thereby making such sections more like hyperbolic sections and achieving a considerable improvement in light distribution.

I claim:—

1. A concave reflector, part of which is divided into parallel configurations or sections which have their edges in planes parallel to each other to project the rays of light reflected therefrom into an elongated elliptical shape in cross section, and other parts being substantially portions of a surface of revolution of a conic section to project the rays issuing from a light source at its focus in a beam of substantially circular cross section positioned about the minor axis of said elongated ellipse.

2. A reflector having the general outline of a surface generated by the curve of a conic section sub-divided into zones or sub-surfaces lying side by side from left to right of the reflector, each zone or sub-surface extending from substantially the upper side of the reflector across the reflector to substantially the lower side thereof, the curved surface of each zone being slightly distorted from the curve of revolution of a conic section and so shaped that the reflector as a whole will project from a source of light at the focus a main beam of light of elongated elliptical shape in cross section, said zones or sub-surfaces having between them intervening surfaces with curvatures substantially that of a surface of revolution of a conic section, whereby the intervening curved surfaces are adapted to increase the intensities of light in a circle around the inter section of the major and minor axes of said elliptical cross section of said light beam.

3. A reflector comprising a number of contiguous surfaces the bounding edges of all of which lie substantially in parallel planes, the curvature of the surfaces at the bounding edges being that of different parallel sections of the same conic surface of revolution and the cross sections of each alternate surface being of the same contour, the other surfaces being substantially of said surface of revolution throughout so that when a source of light is placed at or about the focal point of the reflector, the reflector will project a beam of light in cross section of considerably greater height vertically over a comparatively narrow strip located centrally between the ends of the beam than at such ends.

In testimony whereof I have affixed my signature.

JOHN GRAEME BALSILLIE.